(12) United States Patent
Robertson et al.

(10) Patent No.: US 10,855,705 B2
(45) Date of Patent: Dec. 1, 2020

(54) ENHANCED FLOW-BASED COMPUTER NETWORK THREAT DETECTION

(71) Applicant: Cisco Technology, Inc., San Jose, CA (US)

(72) Inventors: Matthew Scott Robertson, Santa Clara, CA (US); Darrin Joseph Miller, Marysville, OH (US); Sunil Navinchandra Amin, Atlanta, GA (US); Paul Wayne Bigbee, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 345 days.

(21) Appl. No.: 15/720,553

(22) Filed: Sep. 29, 2017

(65) Prior Publication Data

US 2019/0104144 A1  Apr. 4, 2019

(51) Int. Cl.
*H04L 29/06* (2006.01)
*H04L 12/24* (2006.01)
*G06F 21/50* (2013.01)
*G06F 21/55* (2013.01)
*H04L 12/26* (2006.01)

(52) U.S. Cl.
CPC ...... *H04L 63/1425* (2013.01); *H04L 41/0893* (2013.01); *H04L 63/1433* (2013.01); *G06F 21/50* (2013.01); *G06F 21/55* (2013.01); *H04L 43/026* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 7,185,368 B2 | 2/2007 | Copeland | |
| 7,263,719 B2 | 8/2007 | Jemes et al. | |
| 7,290,283 B2 | 10/2007 | Copeland | |
| 7,512,980 B2 | 3/2009 | Copeland et al. | |
| 7,475,426 B2 | 8/2009 | Kashyap et al. | |
| 7,644,151 B2 | 1/2010 | Jerrim et al. | |
| 7,886,358 B2 | 2/2011 | Copeland | |
| 7,895,326 B2 | 2/2011 | Jerrim et al. | |

(Continued)

OTHER PUBLICATIONS

"Cisco Catalyst 3850 Switch", Services Guide, Apr. 2013, C07-727066-00, Cisco Systems, Inc., 70 pages.

*Primary Examiner* — William J. Goodchild
(74) *Attorney, Agent, or Firm* — Edell, Shapiro & Finnan, LLC

(57) ABSTRACT

In one example embodiment, a threat detection server receives metadata of a network flow in a network; a zone definition that correlates the metadata of the network flow with a first zone of network devices in the network and a second zone of network devices in the network, where the network flow was transmitted from the first zone to the second zone; and a security policy for the network flow, where the security policy is enforced on the basis of the first zone and the second zone. Based on the zone definition, the threat detection server annotates a flow record that includes the metadata with an indication of the first zone and the second zone. Based on the annotated flow record and the security policy, the threat detection server determines whether to generate a notification associated with a detection of a security threat associated with the network flow.

20 Claims, 7 Drawing Sheets

(56) References Cited

U.S. PATENT DOCUMENTS

| | | | |
|---|---|---|---|
| 9,288,234 B2* | 3/2016 | Barr | H04L 63/205 |
| 2002/0053033 A1* | 5/2002 | Cooper | H04L 41/0681 |
| | | | 726/7 |
| 2005/0063528 A1* | 3/2005 | Pearson | H04M 3/54 |
| | | | 379/211.01 |
| 2009/0168648 A1* | 7/2009 | Labovitz | H04L 43/0876 |
| | | | 370/229 |
| 2012/0030750 A1* | 2/2012 | Bhargava | H04L 63/1416 |
| | | | 726/13 |
| 2012/0166394 A1* | 6/2012 | Kim | G06F 16/184 |
| | | | 707/634 |
| 2014/0331274 A1* | 11/2014 | Bitton | H04L 63/1408 |
| | | | 726/1 |
| 2014/0331280 A1* | 11/2014 | Porras | H04L 63/20 |
| | | | 726/1 |
| 2016/0294870 A1* | 10/2016 | Banerjee | H04L 63/0227 |

* cited by examiner

300

| ATTRIBUTE | VALUE |
|---|---|
| CLIENT IP ADDRESS | 10.1.1.2 |
| SERVER IP ADDRESS | 10.2.2.2 |
| CLIENT PORT NO. | 45678 |
| SERVER PORT NO. | 80 |
| PROTOCOL | TCP |
| CLIENT BYTES | 456 |
| SERVER BYTES | 34323 |
| ⋮ | ⋮ |
| START TIME | 12:00:00 |
| END TIME | 12:01:00 |

| ATTRIBUTE | VALUE |
|---|---|
| CLIENT IP ADDRESS | 10.1.1.2 |
| SERVER IP ADDRESS | 10.2.2.2 |
| CLIENT PORT NO. | 45678 |
| SERVER PORT NO. | 80 |
| PROTOCOL | TCP |
| CLIENT BYTES | 456 |
| SERVER BYTES | 34323 |
| ⋮ | ⋮ |
| START TIME | 12:00:00 |
| END TIME | 12:01:00 |
| SOURCE ZONE | CONTRACTORS GROUP |
| DESTINATION ZONE | CONFIDENTIAL SERVERS GROUP |

FIG.4

ENHANCED FLOW-BASED COMPUTER NETWORK THREAT DETECTION

TECHNICAL FIELD

The present disclosure relates to computer network threat detection.

BACKGROUND

Current flow-based threat detection systems detect security threats or security policy violations through a variety of differing algorithmic approaches such as machine learning, statistical analysis, heuristic or even custom (locally defined) rules based on transactional telemetry into an analytics engine. These systems generally rely solely on transactional telemetry and locally defined contexts.

BRIEF DESCRIPTION OF THE DRAWINGS

FIG. 3 illustrates a flow record entity, according to an example embodiment.

FIG. 4 illustrates an annotated flow record, according to an example embodiment.

DESCRIPTION OF EXAMPLE EMBODIMENTS

Overview

In one example embodiment, a threat detection server receives metadata of a network flow in a network; a zone definition that correlates the metadata of the network flow with a first zone of network devices in the network and a second zone of network devices in the network, where the network flow was transmitted from the first zone to the second zone; and a security policy for the network flow, where the security policy is enforced on the basis of the first zone and the second zone. Based on the zone definition, the threat detection server annotates a flow record that includes the metadata with an indication of the first zone and the second zone. Based on the annotated flow record and the security policy, the threat detection server determines whether to generate a notification for detection of a security threat associated with the network flow.

Example Embodiments

Figure 1:
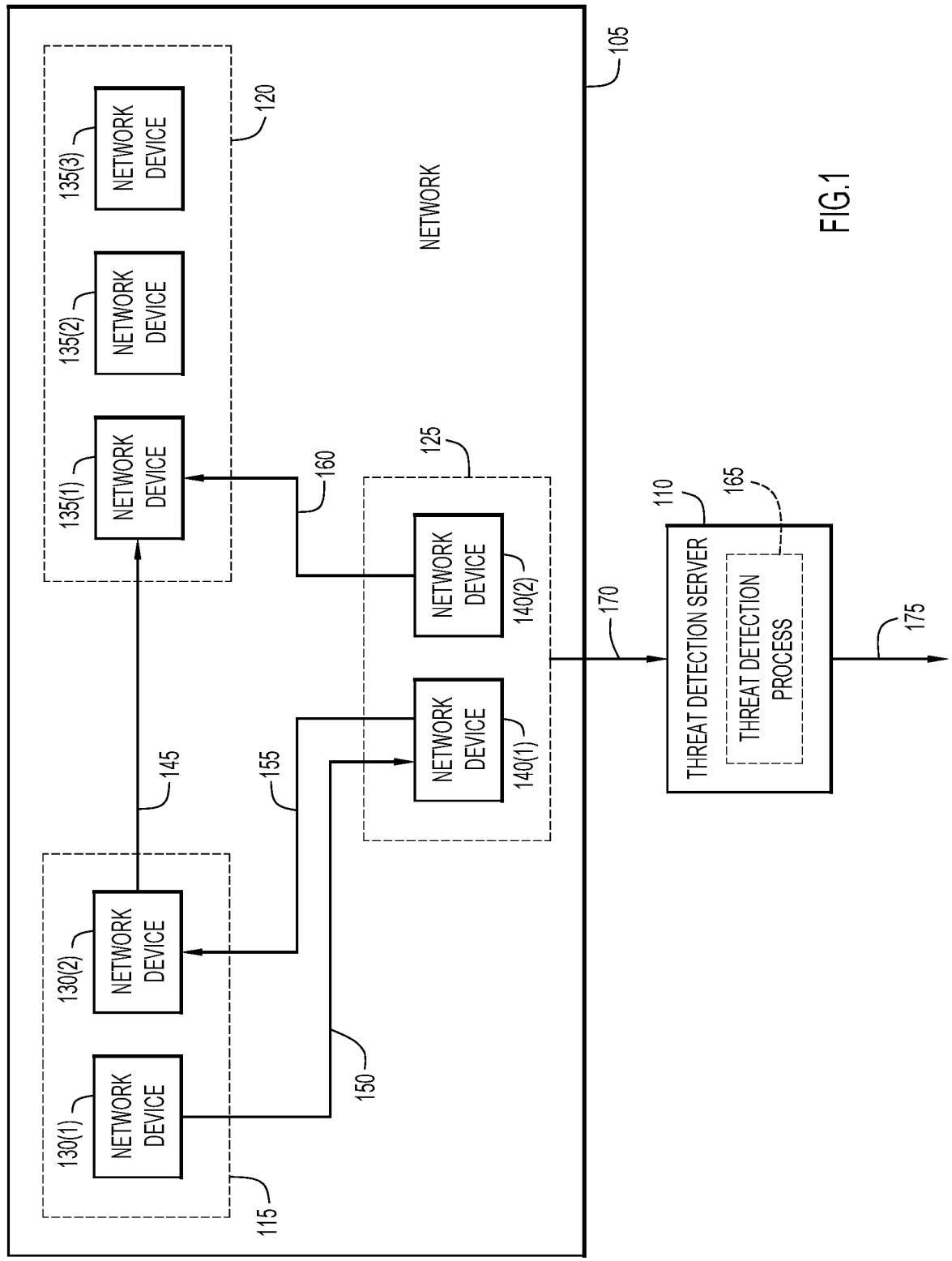
FIG. 1 is a block diagram of a system for detecting computer network threats, according to an example embodiment.

With reference first to FIG. 1, shown is a block diagram of a system 100 for detecting computer network threats in accordance with examples presented herein. System 100 includes a network 105 and a threat detection server 110. In this example, network 105 includes three zones (i.e., logical groupings) of devices in the network 105, as shown at 115, 120, and 125. Zone 115 includes network devices 130(1)-130(2), zone 120 includes network devices 135(1)-135(3), and zone 125 includes network devices 140(1)-140(2). It will be appreciated that, in general, a zone may include any number of network devices.

Zones 115, 120, and 125 transmit network traffic/flows to each other. For example, network device 130(2) transmits a network flow to network device 135(1), as shown at 145. Since network device 130(2) is in zone 115 and network device 135(1) is in zone 120, zone 115 transmitted network flow 145 to zone 120. Other examples of inter-zone network flows are also provided: zone 115 (network device 130(1)) transmits network flow 150 to zone 125 (network device 140(1)); zone 125 (network device 140(1)) transmits network flow 155 to zone 115 (network device 130(2)); and zone 125 (network device 140(2)) transmits network flow 160 to zone 120 (network device 135(1)).

In the example of FIG. 1, one or more security policies may prohibit certain types of inter-zone network flows. Conventionally, state of the art threat detection often fails to properly account for contextual definitions from every enterprise security system in the network. For example, a system operator may configure locally defined security policies at a threat detection system management application but not at an access control system. This is because in current flow-based threat detection systems, custom security events are created in isolation. The lack of synchronicity between the threat detection system management application and the access control policy can lead to security threat misdiagnoses, inaccurate alarm level warnings, and improperly implemented/enforced security policies.

For example, a threat detection system management application may create a rule disallowing communication between a network endpoint [a] and an application server [b] using certain transactional constructs (e.g., ports, protocols, etc.). These communications may be classified as low sensitivity in the threat detection system management application. Meanwhile, an administrator of the access control system might create a security policy for the same application server [b], only labeling any communication from a zone of devices [c] that includes network endpoint [a] as highly sensitive. Thus, the threat detection system management application has a rule stating that communication [a] <-----> [b] has low sensitivity, and the access control system has a rule stating that communication [c] <-----> [b] has high sensitivity. As such, communication [a] <-----> [b] may be treated as a low sensitivity event even though the access control system indicates that this is a high sensitivity event. For example, when communication [a] <-----> [b] occurs, an alarm may be added to a large log of low sensitivity alarms, instead of a smaller log of high sensitivity alarms. It should be appreciated that "<---->" denotes bidirectional communications, e.g., "[a] <----> [b]" denotes bidirectional communications between network endpoint [a] and application server [b].

As such, threat detection server 110 implements a threat detection process 165 to leverage contextual definitions defined in various threat detection systems (e.g., threat detection system management applications, access control systems, etc.). For example, detection server 110 may automatically collect/receive a security policy from multiple threat detection systems for network 105. The policy definitions may be enforced on the basis of zones 115-125. The threat detection server 110 may also receive metadata of network flows 145-160 and definitions of zones 115-125 (at 170). The threat detection process 165 may consolidate and enforce these security policy definitions accordingly. As shown at 175, the threat detection server 110 may generate a threat detection notification.

For instance, threat detection server 110 may receive metadata of network flow 145, definitions of zones 115 and 120, and policy definitions (e.g., a security policy for certain network flows between zones 115 and 120, such as network flow 145). The threat detection server 110 may receive the metadata, zone definitions, and/or policy definitions from the network 105 and/or from other systems dedicated to tracking such data. Based on the metadata, zone definitions, and/or policy definitions, the threat detection server 110 may determine that the network flow 145 is subject to the security policy because, for example, network flow 145 was transmitted from zone 115 to zone 120 with certain transactional constructs (e.g., ports, protocols, etc.). Thus, threat detection server 110 may produce a threat detection notification 175 for network flow 145. In other words, the threat detection server 110 may determine whether to generate a notification for detection of a security threat associated with the network flow, and may further generate the notification associated with the detection of the security threat.

The threat detection server 110 may, for example, receive Source Group Tags (SGTs) as zone definitions, and TrustSec relationship policies as security policies. Groups (zones) and policies in other systems (e.g., network objects in Cisco Systems' Defense Orchestrator (CDO), Endpoint Groups (EPG) defined in an Application Centric Infrastructure (ACI), etc.) may be leveraged as well. For example, threat detection server 110 may monitor (and generate alarms for) policy violations between EPGs in the ACI domain, and policy violations between TrustSec and ACI domains. Other group (zone) definitions may include Cisco Systems' Identity Services Engine (ISE), which adds support for groups and policies defined in other Software Defined Networking (SDN) domains including OpenDaylight (ODL), Amazon Web Services (AWS) and Microsoft Azure. Normalizing the network objects into groups (zones) enables threat monitoring between these widely disparate systems. This is not possible with existing technology.

As explained in greater detail below, threat detection server 110 may automatically enforce policies from various sources/systems/engines (e.g., "zone A cannot communicate with zone B") by annotating flow records of network communications with zone definitions. This facilitates enterprise-wide policy monitoring and threat detection using "non-denominational" group/zone and policy definitions as inputs. These techniques facilitate the detection of unauthorized network usage/intrusions through the use of policy, zone, and flow metadata telemetry.

Figure 2:
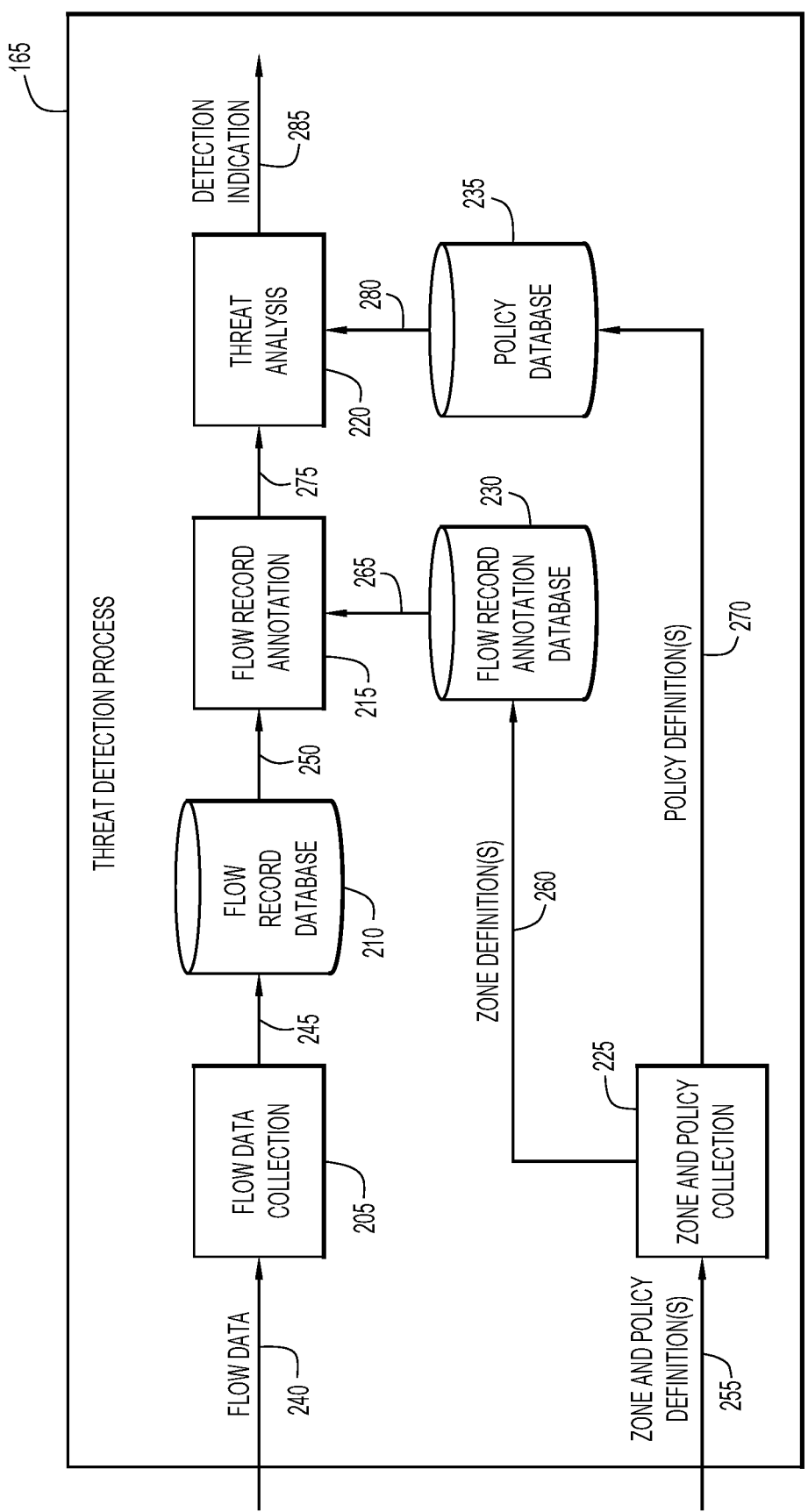
FIG. 2 is a functional diagram of a threat detection process, according to an example embodiment.

With reference to FIG. 2, shown is a functional block diagram of threat detection process 165 in accordance with examples presented herein. Each of the blocks shown in FIG. 2 may be implemented in software running on a server or other computing apparatus. Threat detection process 165 involves flow data collection functional component 205, flow record database 210, flow record annotation functional component 215, threat analysis functional component 220, zone and policy collection functional component 225, flow record annotation database 230, and policy database 235. Briefly, components/databases 205-235 enable the flow-based detection of network intrusions by collecting and analyzing network flow (e.g., network flows 145-160) metadata and applying zone and policy definitions obtained from individual systems. In other words, threat detection process 165 involves using contextual data relating to network flows as telemetry annotation data for the purposes of threat detection.

In one example, threat detection server 110 receives flow data 240 at flow data collection component 205. The flow data collection component 205 collects statistics/metadata of network flows from different network telemetry sources. Examples of common telemetry sources include Cisco Internetwork Operating System (IOS) NetFlow, or Internet Protocol Flow Information Export (IPFIX) as specified in Internet Engineering Task Force (IETF) Request for Comments (RFC) 7011. The flow data collection component 205 may correlate and synthesize the different telemetry sources into a single data record (referred to herein as a "flow record") containing relevant data elements defining the end-to-end client-to-server network flow.

An example flow record 300 is illustrated in FIG. 3. Flow record 300 includes metadata of network flow 145 (FIG. 1) such as the client IP address, server IP address, client port number, server port number, communication protocol, client bytes, server bytes, start time, and end time. In this example, network device 130(2) is the client network device and network device 135(1) is the server network device. More specifically, network device 130(2) has the client IP address 10.1.1.2, and network device 135(1) has the server IP address 10.2.2.2. According to flow record 300, network device 130(2) sent network flow 145 from port 45678, and network device 135(2) received network flow 145 at port 80. The protocol by which network flow 145 was transmitted is Transmission Control Protocol (TCP). There are 456 associated network device 130(2) bytes and 34323 associated network device 135(2) bytes. The time at which network device 130(2) sent network flow 145 is 12:00:00, and the time at which network device 135(1) received network flow 145 is 12:01:00.

Returning to FIG. 2, as shown at 245, the threat detection process 165 may further include storing flow record 300 in the flow record database 210. As will be discussed in greater detail below, the threat detection server 110 may forward the flow record 300 from the flow record database 210 to the flow record annotation component 215 (shown at 250).

The threat detection server 110 also collects zone and policy definitions 255 for the flow record 300 at the zone and policy collection component 225. As mentioned above, the zone and policy definitions 255 may be collected from other network management or security systems. The telemetry channel (communication bus) by which the zone and policy collection component 225 receives the zone and policy definitions may be built on standards (e.g., Cisco Systems' Platform Exchange Grid (pxGrid) with custom eXtensible Markup Language (XML) or JavaScript Object Notation (JSON) message formats; eXtensible Access Control Markup Language (XACML); WS-SecurityPolicy; etc.).

After collecting the zone and policy definitions 255, the zone and policy collection component 225 may correlate and synthesize the zone and policy definitions 255 to extract meaningful zone and policy definitions. As shown at 260, the zone and policy collection component 225 may store the zone definition(s) in flow record annotation database 230. The zone definitions may provide context for the flow record 250, and may include group mappings for network entities. For example, the zone definitions may indicate that network device 130(2) is in zone 115 and network device 135(1) is in zone 120. In one example, the zone definitions include a SGT definition that maps the functionality/role of network device 130(2) to the IP address of network device 130(2). Zone definitions may be fields in NetFlow telemetry, and may also be referred to as "attributes" (i.e., attributes of the flow record).

The threat detection server 110 may forward the zone definitions 260 from the flow record annotation database 230 to the flow record annotation component 215 (shown at 265). The flow record annotation component 215 may use the received zone definitions to annotate the received flow record 300. More specifically, the flow record annotation component 215 may receive zone definitions 260 as outputs of the zone and policy collection 225, synthesize the zone definitions 260, and match the zone definitions 260 to the flow record(s) maintained in the flow record database 210. The flow record annotation component 215 may match the attributes to the flow that is being modelled based on network flow data. For example, the flow record annotation component 215 may associate the SGT with the IP address entity to which the SGT was mapped, and insert (annotate) the SGT into active (current) and/or future flow records involving that IP address. In other words, the flow record annotation component 215 may annotate the flow record with SGTs.

An example output of the flow record annotation component 215 is represented by annotated flow record 400 in FIG. 4. Annotated flow record 400 is a marked-up version of flow record 300. Annotated flow record 400 includes the same information as flow record 300, but was annotated (by flow record annotation component 215) to further include information regarding the source and destination zones of network flow 145. As explained in greater detail below, the flow record annotation component 215 may forward the annotated flow record 400 to the threat analysis component 220.

In the example of FIG. 4, the source zone is indicated as being the "contractors group," and the destination zone is indicated as being the "confidential servers group." In other words, network device 130(2) belongs to the contractors group (i.e., zone 115 is the contractors group), and network device 135(1) belongs to the confidential servers group (i.e., zone 120 is the confidential servers group). The flow record annotation component 215 may, for example, determine which zones the network devices 130(2) and 135(1) belong to, based on the IP addresses of network devices 130(2) and 135(1). In other words, flow record annotation component 215 may determine that the IP address of network device 130(2) (i.e., 10.1.1.2) belongs to the contractors group, and that the IP address of network device 135(2) (i.e., 10.2.2.2) belongs to the confidential servers group. Both the contractors and confidential servers groups may be internal to an enterprise that uses network 105.

Referring back to FIG. 2, as shown at 270, the zone and policy collection component 225 may store the policy definition(s) in policy database 235. A policy definition may indicate, for example, that members of the contractors group cannot communicate with the confidential servers group. This policy may be defined in, and obtained from, a separate policy engine. The zone policy collection component 225 may synthesize this policy definition and store the policy definition in the policy database 235 as an entity describing a threat condition (e.g., "if a flow occurs between members of the contractors group and the confidential servers group, generate an alarm."). This output may also be referred to as a "threat flow signature." In one example, the policy is manually configured using Cisco Systems' Stealthwatch™ service.

The threat detection process 165 may further involve forwarding the policy definition from the policy database 235 to the threat analysis component 220 (as shown at 280). The threat analysis component 220 may compare the received annotated flow record 400 with the received policy definition to determine whether a threat event has occurred. In this example, network flow 145 is a communication from the contractors group to the confidential servers group. Since the policy definition prohibits this type of communication, an appropriate action may be taken (e.g., triggering an alarm). As such, threat analysis component 220 outputs a detection indication 285. This detection indication 285 may, for example, notify a network administrator of a potential security threat. In one example, the alarm may be generated via a service such as the Cisco Stealthwatch service.

In another example, the flow record annotation component 215 may determine that a source network device belongs to a point of sale group, and a destination network device belongs to an Internet group. In this example, the threat analysis component 220 may generate an alarm in response to a policy mandating that point of sale terminals cannot communicate with Internet devices. As mentioned, threat analysis component 220 may enforce policies based on other metadata in the flow record in addition to/aside from IP addresses (e.g., client/server ports, communication protocol, etc.). In addition, these techniques may be agnostic as to the IP address version provided, for example, that the network is able to report flow data (e.g., using NetFlow, IPFIX, etc.). More specifically, these techniques are compatible with, for example, IP version 4 (IPv4) and IP version 6 (IPv6).

The threat detection process 165 may involve storing a flow record in the flow record database 210 before annotating the flow record at flow record annotation component 215. This allows for the so-called "late binding" of the zone definitions to the flow record at flow record annotation component 215. This avoids directly marking up the flow record, which would pollute the true network data, instead facilitating not only real time detection but also the ability for lookback activity to occur. This enables, for example, posthumously detecting an event based on a re-definition of a host (e.g., an updated zone definition) or an updated security policy, or testing a policy against a pre-built flow record database (e.g., flow record database 210).

For example, "late binding" permits the threat detection server 110 to receive an updated zone definition that correlates the metadata of the network flow with a third zone of network devices in the network and/or a fourth zone of network devices in the network (e.g., the third and fourth network zones may be updated definitions for the source and destination zones). The threat detection server 110 may annotate the stored record flow based on the updated zone definition to generate an updated annotated flow record and, based on the updated annotated flow record and the security policy, determine whether to generate the notification. In another example, the threat detection server 110 may receive an updated security policy for the network flow, where the updated security policy is enforced on the basis of the first (e.g., source) zone and the second (e.g., destination) zone. Based on the annotated flow record and the updated security policy, the threat detection server 110 may determine whether to generate the notification.

The techniques described herein may generate alarms on unwanted communications or intrusions between zones by treating both the zone definition and the policy definition of the unwanted communication as telemetry inputs. With respect to policy definitions of unwanted communications in a separate system, for example, if a policy system (e.g., Cisco Systems' ISE) indicates that communications between two hosts/groups/zones A and B are forbidden, then the statement "A cannot communicate with B" may be treated as input to the analytics engine. A may be defined in one zone, and B in another zone. In the event of communication from A to B, an alarm may be triggered. With respect to zone definitions, rather than rely on internal port profiling, user configuration, or subnet definitions (for example), the logical zone is determined from a zone definition inputted through telemetry from another system. Zone definitions may be static or dynamic. The definition of the zone may be derived by reading the attributes for the object from the telemetry source (e.g., user context from ISE, EPGs from ACI, tags from AWS, etc.) and then normalized into a definition of a zone that can be used for analytics.

Figure 5:
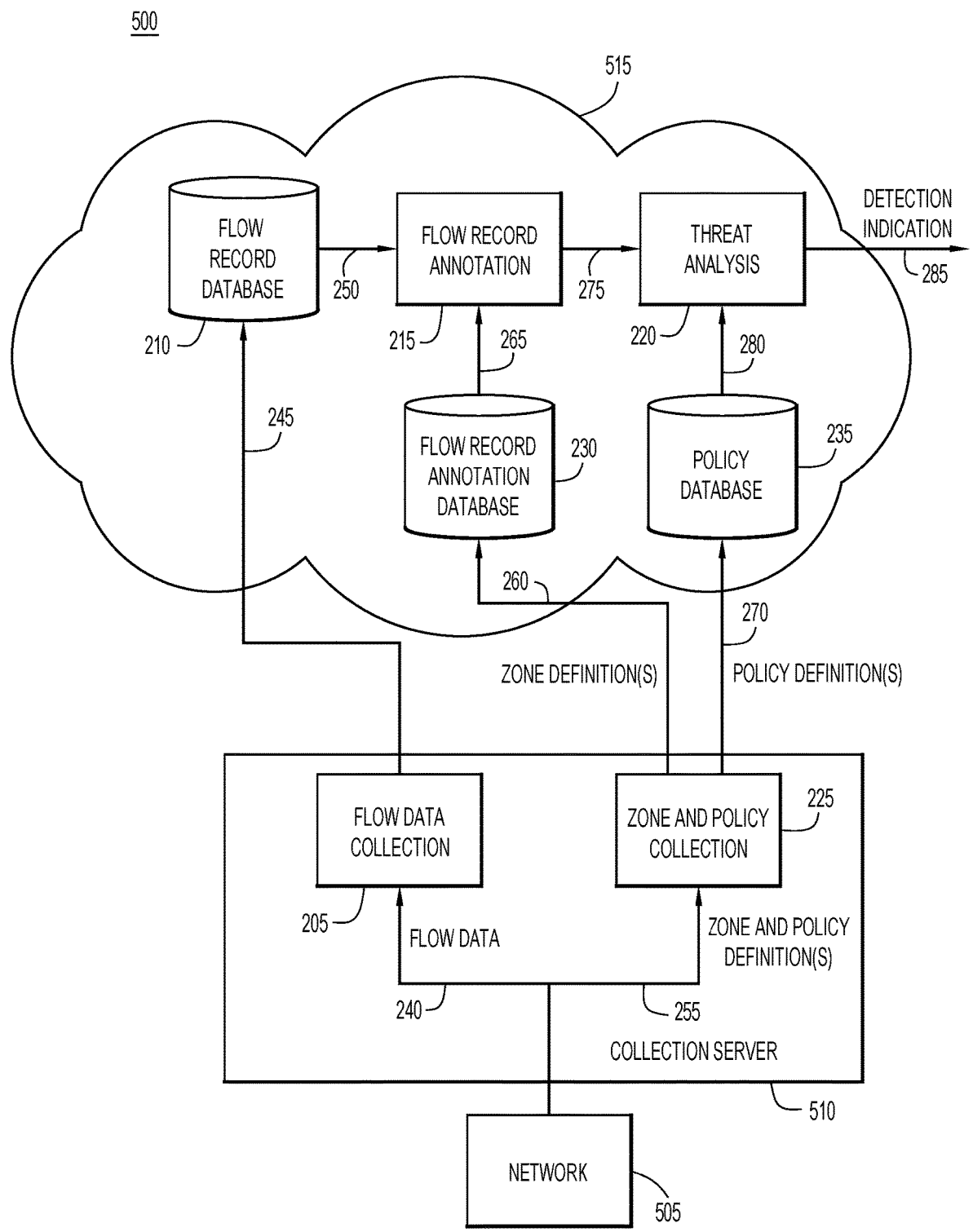
FIG. 5 is a block diagram of a system for detecting computer network threats, according to another example embodiment.

FIG. 5 illustrates system 500 for detecting computer network threats according to another embodiment. System 500 enables the techniques described herein to be implemented as a Software-as-a-Service (SaaS) feature. System 500 includes a network 505, collection server 510, and cloud 515 embodied by one or more servers. The network 505 may be similar to network 105 (FIG. 1). The collection server 510 and cloud 515 include many of the same components as threat detection process 165. The collection server 510 includes flow data collection component 205 and zone and policy collection component 225. The cloud 515 includes the flow record database 210, flow record annotation component 215, threat analysis component 220, flow record annotation database 230, and policy database 235. These component may be running on one or more servers (not shown) in the cloud 515.

The various component and databases shown in FIG. 5 operate in a similar manner as in the example of FIG. 2 to generate detection indication 285. Similar to the system 100 in FIG. 1, the policy definitions may be forwarded to the zone policy collection component 225 indirectly from various policy engines via network 505. Alternatively, the policy definitions may be forwarded directly from various policy engines (not shown). In addition, in other embodiments, one or both of the flow data collection component 205 and the zone and policy collection component 225 may be implemented in the cloud 515.

Figure 6:
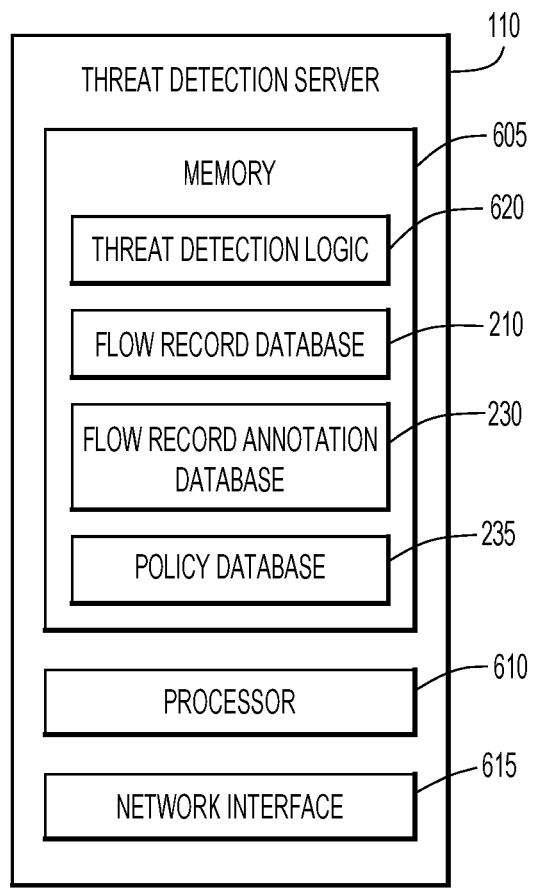
FIG. 6 is a block diagram of a computing device configured to execute threat detection techniques presented herein, according to an example embodiment.

FIG. 6 is a block diagram of threat detection server 110, as shown in FIG. 1. In this example, the threat detection server 110 includes a memory 605, one or more processors 610, and a network interface 615. The memory includes instructions for threat detection logic 620, as well as flow record database 210, flow record annotation database 230, and policy database 235, which are shown in FIG. 2. The one or more processors 610 are configured to execute instructions stored in the memory 605 (e.g., instructions for threat detection logic 620). When executed by the one or more processors 610, the threat detection logic 620 enables the threat detection server 110 to perform the operations associated with threat detection process 165 described herein.

The memory 605 may be read only memory (ROM), random access memory (RAM), magnetic disk storage media devices, optical storage media devices, flash memory devices, electrical, optical, or other physical/tangible memory storage devices. Thus, in general, the memory 605 may comprise one or more tangible (non-transitory) computer readable storage media (e.g., a memory device) encoded with software comprising computer executable instructions and when the software is executed (by the processor 610) it is operable to perform the operations described herein.

Figure 7:
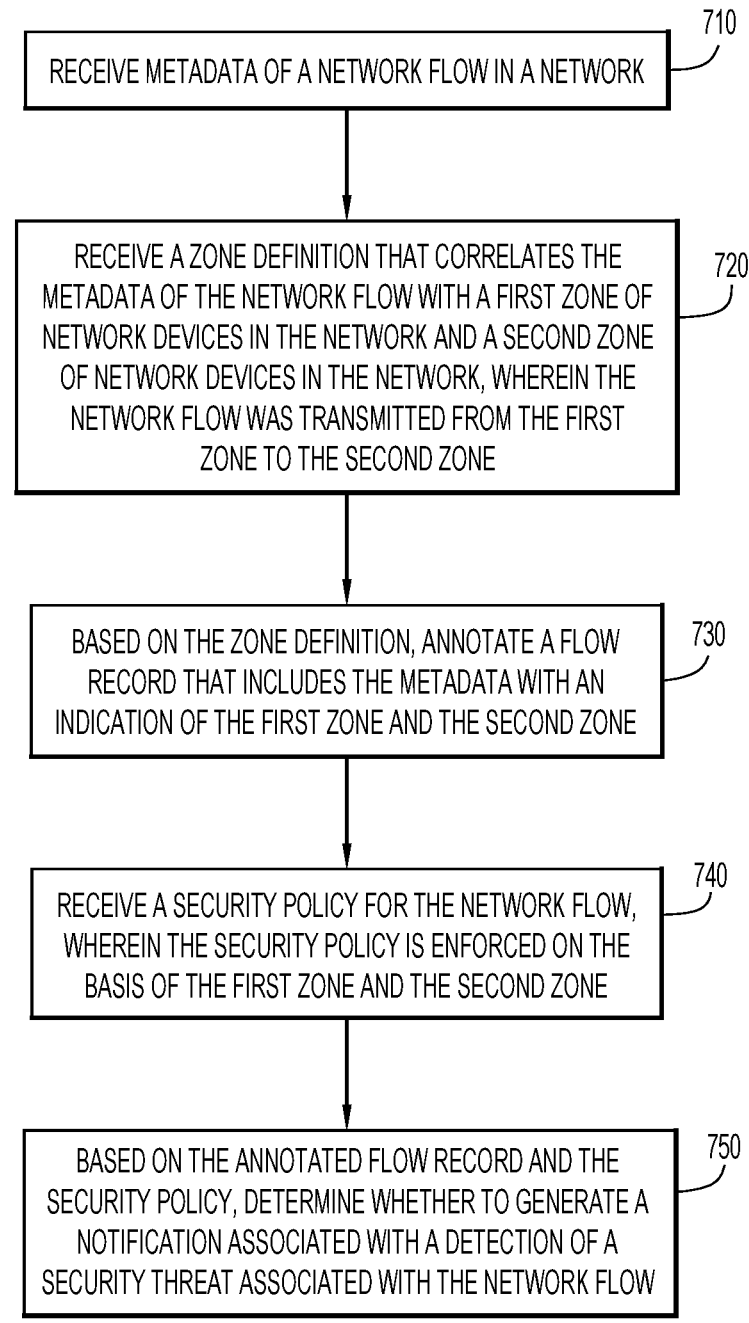
FIG. 7 is a flowchart of a generalized method for threat detection techniques presented herein, according to an example embodiment.

FIG. 7 is a flowchart 700 of a method in accordance with examples presented herein. At 710, a server (e.g., the threat detection server 110 shown in FIG. 1) receives metadata of a network flow in a network. At 720, the server receives a zone definition that correlates the metadata of the network flow with a first zone of network devices in the network and a second zone of network devices in the network, wherein the network flow was transmitted from the first zone to the second zone. At 730, based on the zone definition, the server annotates a flow record that includes the metadata with an indication of the first zone and the second zone. At 740, the server receives a security policy for the network flow, wherein the security policy is enforced on the basis of the first zone and the second zone. At 750, based on the annotated flow record and the security policy, the server determines whether to generate a notification associated with a detection of a security threat associated with the network flow.

There are many alternative/additional embodiments that involve, for example, using zone policy definitions obtained from various security systems to mark up (annotate) network flow data and thereby comply with a threat detection policy in a single system. These techniques may leverage group (zone) definitions and memberships, as well as related security policies, as input to the flow-based threat detection system.

In addition, applications may extend outside of threat detection as well. For example, threat analysis component 220 may output the detection of the event to a policy modeling and authoring system which, instead of treating the detection as a threat, treats the detection as a potential misconfiguration of a policy and adjusts the policy authored (or to be authored) to policy controllers such as a software-defined segmentation controller.

Additional applications may include using the zone and policy definitions in combination with flow analytics rules. For example, the threat analysis component 220 may leverage statistical learning processes to create rules such as, "If host A is a member of the confidential server source group and is uploading a significant amount of information, generate an alarm." Such processes may use the inputted annotated flow record and/or policy database. Furthermore, the zone and policy definitions and/or sensitivity may be used to heighten the severity of the result (e.g., alarm).

An unwanted communication (network flow) between zones may be detected, where the unwanted communication is determined based on received telemetry from one or more separate/independent policy systems. The unwanted communication, zone definition, and policy definition may be automatically obtained as telemetry data. These techniques facilitate the flow-based detection of intrusions through the use of metadata that may be attached to (used to annotate) a network flow.

These techniques enable detecting threats operating on the network interior. Previously, policy and zone constructs (definitions) were described in isolation in policy engines and were not necessarily accurately reflected in conventional detection solutions. This has become apparent in many recent breaches, in which a threat or access control condition is met but the isolated nature of the systems did not accurately detect the severity of the threat.

The treatment of policy and zone definitions as annotations/mark-ups for analysis against flow data may allow for higher fidelity and prioritization of alarms as well as the heightened ability to define and implement consistent policy. In addition, accurate and high fidelity alarms may greatly improve existing (e.g., SDN based) automated threat response systems.

In one form, a method is provided. The method comprises: receiving metadata of a network flow in a network; receiving a zone definition that correlates the metadata of the network flow with a first zone of network devices in the network and a second zone of network devices in the network, wherein the network flow was transmitted from the first zone to the second zone; based on the zone definition, annotating a flow record that includes the metadata with an indication of the first zone and the second zone; receiving a security policy for the network flow, wherein the security policy is enforced on the basis of the first zone and the second zone; and based on the annotated flow record and the security policy, determining whether to generate a notification associated with a detection of a security threat associated with the network flow.

In another form, an apparatus is provided. The apparatus comprises: a network interface configured to enable network communications; and one or more processors coupled to a memory and the network interface, wherein the one or more processors are configured to: receive metadata of a network flow in a network; receive a zone definition that correlates the metadata of the network flow with a first zone of network devices in the network and a second zone of network devices in the network, wherein the network flow was transmitted from the first zone to the second zone; based on the zone definition, annotate a flow record that includes the metadata with an indication of the first zone and the second zone; receive a security policy for the network flow, wherein the security policy is enforced on the basis of the first zone and the second zone; and based on the annotated flow record and the security policy, determine whether to generate a notification associated with a detection of a security threat associated with the network flow.

In another form, one or more non-transitory computer readable storage media are provided. The non-transitory computer readable storage media are encoded with instructions that, when executed by a processor, cause the processor to: receive metadata of a network flow in a network; receive a zone definition that correlates the metadata of the network flow with a first zone of network devices in the network and a second zone of network devices in the network, wherein the network flow was transmitted from the first zone to the second zone; based on the zone definition, annotate a flow record that includes the metadata with an indication of the first zone and the second zone; receive a security policy for the network flow, wherein the security policy is enforced on the basis of the first zone and the second zone; and based on the annotated flow record and the security policy, determine whether to generate a notification associated with a detection of a security threat associated with the network flow.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a threat detection server including a memory and one or more processors:
receiving metadata of a network flow in a network;
receiving a zone definition that correlates the metadata of the network flow with a first zone of network devices in the network and a second zone of network devices in the network, wherein the network flow was transmitted from the first zone to the second zone;
generating a flow record that includes the metadata;
storing the flow record in a flow record annotation database to generate a stored flow record;
after generating the flow record, based on the zone definition, annotating the flow record with an indication of the first zone and the second zone to generate an annotated flow record;
receiving a security policy for the network flow, wherein the security policy is enforced based on the first zone and the second zone;
based on the annotated flow record and the security policy, determining whether to generate a notification associated with a detection of a security threat associated with the network flow; and
annotating the stored flow record based on an updated zone definition that correlates the metadata of the network flow with a third zone of network devices in the network or a fourth zone of network devices in the network, wherein the network flow was transmitted from the third zone or to the fourth zone.

2. The method of claim 1, further comprising:
generating the notification associated with the detection of the security threat.

3. The method of claim 1, further comprising:
receiving the updated zone definition.

4. The method of claim 1, further comprising:
receiving an updated security policy for the network flow, wherein the updated security policy is enforced based on the first zone and the second zone; and
based on the stored flow record and the updated security policy, determining whether to generate the notification.

5. The method of claim 1, wherein:
the metadata includes one or more of a client Internet Protocol address, a server Internet Protocol address, a client port number, and a server port number.

6. The method of claim 1, wherein:
annotating the flow record with the first zone and the second zone includes annotating the flow record with source group tags.

7. The method of claim 1, wherein:
receiving the security policy for the network flow includes receiving information associated with the security policy from multiple threat detection systems.

8. An apparatus comprising:
a network interface configured to enable network communications; and
one or more processors coupled to a memory and the network interface,
wherein the one or more processors are configured to:
receive metadata of a network flow in a network;
receive a zone definition that correlates the metadata of the network flow with a first zone of network devices in the network and a second zone of network devices in the network, wherein the network flow was transmitted from the first zone to the second zone;
generate a flow record that includes the metadata;
store the flow record in a flow record annotation database to generate a stored flow record;
after generating the flow record, based on the zone definition, annotate the flow record with an indication of the first zone and the second zone to generate an annotated flow record;
receive a security policy for the network flow, wherein the security policy is enforced based on the first zone and the second zone;
based on the annotated flow record and the security policy, determine whether to generate a notification associated with a detection of a security threat associated with the network flow; and
annotate the stored flow record based on an updated zone definition that correlates the metadata of the network flow with a third zone of network devices in the network or a fourth zone of network devices in the network, wherein the network flow was transmitted from the third zone or to the fourth zone.

9. The apparatus of claim 8, wherein the one or more processors are further configured to:
generate the notification associated with the detection of the security threat.

10. The apparatus of claim 8, wherein the one or more processors are further configured to:
receive the updated zone definition.

11. The apparatus of claim 8, wherein the one or more processors are further configured to:
receive an updated security policy for the network flow, wherein the updated security policy is enforced based on the first zone and the second zone; and
based on the stored flow record and the updated security policy, determine whether to generate the notification.

12. The apparatus of claim 8, wherein:
the metadata includes one or more of a client Internet Protocol address, a server Internet Protocol address, a client port number, and a server port number.

13. The apparatus of claim 8, wherein the one or more processors are configured to annotate the flow record with the first zone and the second zone by annotating the flow record with source group tags.

14. The apparatus of claim 8, wherein the one or more processors are further configured to:
receive information associated with the security policy from multiple threat detection systems.

15. One or more non-transitory computer readable storage media encoded with instructions that, when executed by a processor, cause the processor to:
receive metadata of a network flow in a network;
receive a zone definition that correlates the metadata of the network flow with a first zone of network devices in the network and a second zone of network devices in the network, wherein the network flow was transmitted from the first zone to the second zone;
generate a flow record that includes the metadata;
store the flow record in a flow record annotation database to generate a stored flow record;
after generating the flow record, based on the zone definition, annotate the flow record with an indication of the first zone and the second zone to generate an annotated flow record;
receive a security policy for the network flow, wherein the security policy is enforced based on the first zone and the second zone;
based on the annotated flow record and the security policy, determine whether to generate a notification associated with a detection of a security threat associated with the network flow; and
annotate the stored flow record based on an updated zone definition that correlates the metadata of the network flow with a third zone of network devices in the network or a fourth zone of network devices in the network, wherein the network flow was transmitted from the third zone or to the fourth zone.

16. The one or more non-transitory computer readable storage media of claim 15, wherein the instructions further cause the processor to:
generate the notification associated with the detection of the security threat.

17. The one or more non-transitory computer readable storage media of claim 15, wherein the instructions further cause the processor to:
receive the updated zone definition.

18. The one or more non-transitory computer readable storage media of claim 15, wherein the instructions further cause the processor to:
receive an updated security policy for the network flow, wherein the updated security policy is enforced based on the first zone and the second zone; and
based on the stored flow record and the updated security policy, determine whether to generate the notification.

19. The one or more non-transitory computer readable storage media of claim 15, wherein the metadata includes one or more of a client Internet Protocol address, a server Internet Protocol address, a client port number, and a server port number.

20. The one or more non-transitory computer readable storage media of claim 15, wherein the instructions further cause the processor to:
annotate the flow record with source group tags.

* * * * *